United States Patent [19]

Ahamed

[11] 3,774,153

[45] Nov. 20, 1973

[54] FIELD-ACCESSED, SINGLE-WALL DOMAIN APPARATUS UTILIZING INTERACTING SHIFT REGISTER LOOPS

[75] Inventor: Syed Vickar Ahamed, Berkeley Heights, N.J.

[73] Assignee: Bell Telephone Laboratories, Incorporated, Murray Hill, N.J.

[22] Filed: Nov. 9, 1971

[21] Appl. No.: 196,995

[52] U.S. Cl. .......... 340/146.1 AL

[51] Int. Cl. .......... G06f 11/12

[58] Field of Search .......... 340/146.1 AL, 174 TF; 307/88 LC

[56] References Cited

UNITED STATES PATENTS

| | | | |
|---|---|---|---|
| 3,418,629 | 12/1968 | Chien | 340/146.1 AL |
| 3,577,131 | 5/1971 | Morrow | 340/174 TF |
| 3,676,870 | 7/1972 | Bobeck | 340/174 TF |

OTHER PUBLICATIONS

W. W. Peterson, "Cyclic Codes for Error Detection", Proceedings of the IRE, Jan. 1961, pp. 228–235.

*Primary Examiner*—Felix D. Gruber
*Assistant Examiner*—David H. Malzahn
*Attorney*—W. L. Keefauver et al.

[57] ABSTRACT

Magnetic domain apparatus, for performing binary division and other coding operations of a cyclic nature upon binary information words that are represented by patterns of single-wall domains, are provided. Selected elements in the apparatus are configured to define pluralities of intersecting, closed-loop, domain propagation channels of different propagation path lengths, which are arranged to provided predetermined logical interactions between patterns of domains circulating in the loops in response to a common, reorienting magnetic field.

11 Claims, 3 Drawing Figures

FIELD-ACCESSED, SINGLE-WALL DOMAIN APPARATUS UTILIZING INTERACTING SHIFT REGISTER LOOPS

BACKGROUND OF THE INVENTION

1. Field of the Invention

This invention relates generally to the field of digital, error-correction systems, and more particularly to single-wall, magnetic domain apparatus for implementing the cyclic class of error-correcting codes.

2. Prior Art

A large variety of error-correcting codes have evolved in recent years in the field of digital, electronic, communications systems. Among the most useful of these codes is a class of codes known in the art as the cyclic class of error-correcting codes.

Briefly speaking, any one of the class of cyclic codes is implemented in the following manner. A block of information which is to be encoded for transmission is reduced to binary form. The block of binary information is then duplicated, and the original information is divided by a binary generator function that uniquely characterizes a particular cyclic code. The residue, or remainder, of the division process is then appended onto the duplicated block of binary information as a string of parity bits to form an encoded information word.

After transmission of the encoded information word in any suitable manner, the received information word is decoded in similar fashion by duplicating the received word and dividing the received word by the same binary, generator function. The remainder resulting from this second division process is known as the syndrome. The syndrome is then used in a rather straightforward manner to correct the duplicate of the originally received information word for any errors which may have occurred during the transmission of the original block of information.

An even larger variety of semiconductor encoder and decoder circuits have been developed to implement the cyclic class of codes. The structures of these circuits have, quite naturally, been characterized by properties which are peculiar to the semiconductor logic components of which they are comprised. For example, binary division circuits, which are required in both cyclic encoders and decoders, have often been implemented in one of the basic forms shown in FIGS. 5.01–5.03 on pages 122 and 123 of *Algebraic Coding Theory*, by E. R. Berlekemp, McGraw-Hill Book Co., New York, N. Y. (1968). The division circuits shown in the Berlekemp reference are characterized by pluralities of feedback loops terminating in logical interaction points, which enable binary division to be performed in a parallel manner. These division circuits take advantage in large measure of the fundamental, semiconductor circuit property that all of the involved electronic signals, which are representative of binary information, are readily available for coupling to any other circuit point at any instant of time. But for this fundamental property, the multiple, concurrent interactions between the individual bits of binary information that are required in this parallel form of binary division could not be implemented.

More recently, significant new developments in the art of single-wall, magnetic domain technology have provided fundamentally new methods and components for storing, moving and interacting blocks of binary information represented by patterns of single-wall, magnetic domains. As a result of these developments, apparatus have been reduced to practice in which patterns of single-wall domains in a layer of appropriate material are controllably moved about under various overlay patterns structured upon a surface of the layer of material. By suitably configuring the overlay geometry into patterns of periodically repeating elements, domains located under the overlay are constrained to move under the overlay a distance corresponding to one elemental period each time a magnetic field reorients itself to a predetermined axis in the plane of the surface of the layer of material. For example, domain propagation in a sheet of material may be effected by means of attracting magnetic pole patterns that move along magnetically soft overlays in response to a magnetic field reorienting in the plane of the sheet of material.

The ability to controllably move single-wall domains about in a layer of suitable material in response to a reorienting magnetic field has resulted in the development of a host of basic components for performing elementary logic operations. Among these components are single-wall domain annihilators, domain generators, domain detectors or sensors, domain duplicators, and Exclusive-OR logic circuits.

These and other components have in turn been combined to form domain apparatus for implementing some rather sophisticated information storage and logic functions. For instance, an autonomous scanning circuit, described in U.S. Pat. No. 3,680,067, issued to W.F. Chow on July 25, 1972, utilizes the properties of domain interaction and synchronous movement to perform various logic operations of a consecutive nature between corresponding sets of information represented by patterns of single-wall domains. Another magnetic domain circuit of a similar nature is a buffer memory described in copending application, Ser. No. 89,631, filed Nov. 16, 1970 for A. J. Perneski and R. M. Smith, and assigned to Bell Telephone Laboratories, Incorporated. The buffer memory advantageously utilizes an overlay geometry configured into a number of intersecting shift registers, in which sets of information represented by patterns of single-wall domains are continuously updated and compared to determine status changes in the stored information.

Despite all of these achievements, the advantages of single-wall, magnetic domain technology have not yet been applied to perform binary division, which is required in cyclic encoding and decoding circuitry. Binary division, requires information interactions of a sequential nature which are characteristic of the properties displayed by single-wall domains as they are propagated about in a layer of suitable material.

It is therefore, an object of this invention to utilize the fundamental properties of single-wall, domain interaction and controlled, synchronous, sequenced movement for implementing the cyclic class of error-correcting codes.

It is another object of this invention to provide single-wall, domain apparatus for implementing binary division.

SUMMARY OF THE INVENTION

The invention comprises a new field-access, single-wall domain apparatus in which a domain sensor is provided in conjunction with a first one of two shift register loops for detecting the presence of a domain under a predetermined element location in the first loop. The sensor is configured to control a logic gate for performing logical interactions between patterns of domains circulating in the respective loops. Whenever a domain is detected by the sensor, each of the bits represented in a pattern of domains circulating in the first loop is logically interacted in the logic gate with a duplicate of a corresponding bit represented in a pattern of domains circulating in the second loop. A domain, or the absence of a domain (whichever is representative of the particular interaction product) is gated after each interaction from the output of the logic gate into the first loop at the proper location to replace the particular interacting bit of the first loop. Upon completion of a full circulation cycle, a new circulation pattern of domains representing the complete interaction product of the circulation cycle, has replaced the immediately preceding pattern of domains circulating in the first loop.

BRIEF DESCRIPTION OF THE DRAWINGS

FIG. 1–A shows a schematic illustration of a modified loop for the circuit shown in FIG. 1.

DETAILED DESCRIPTION OF THE INVENTION

Briefly reviewing, the function of a cyclic encoding circuit is to duplicate an uncoded information word, divide the word by a generatr function that is characteristic of a particular cyclic error-correcting code, recover the remainder, or residue, of the division process and append the remainder onto a duplicate of the word as a string of parity checking bits to form an encoded information word.

Figures 1, 1A:
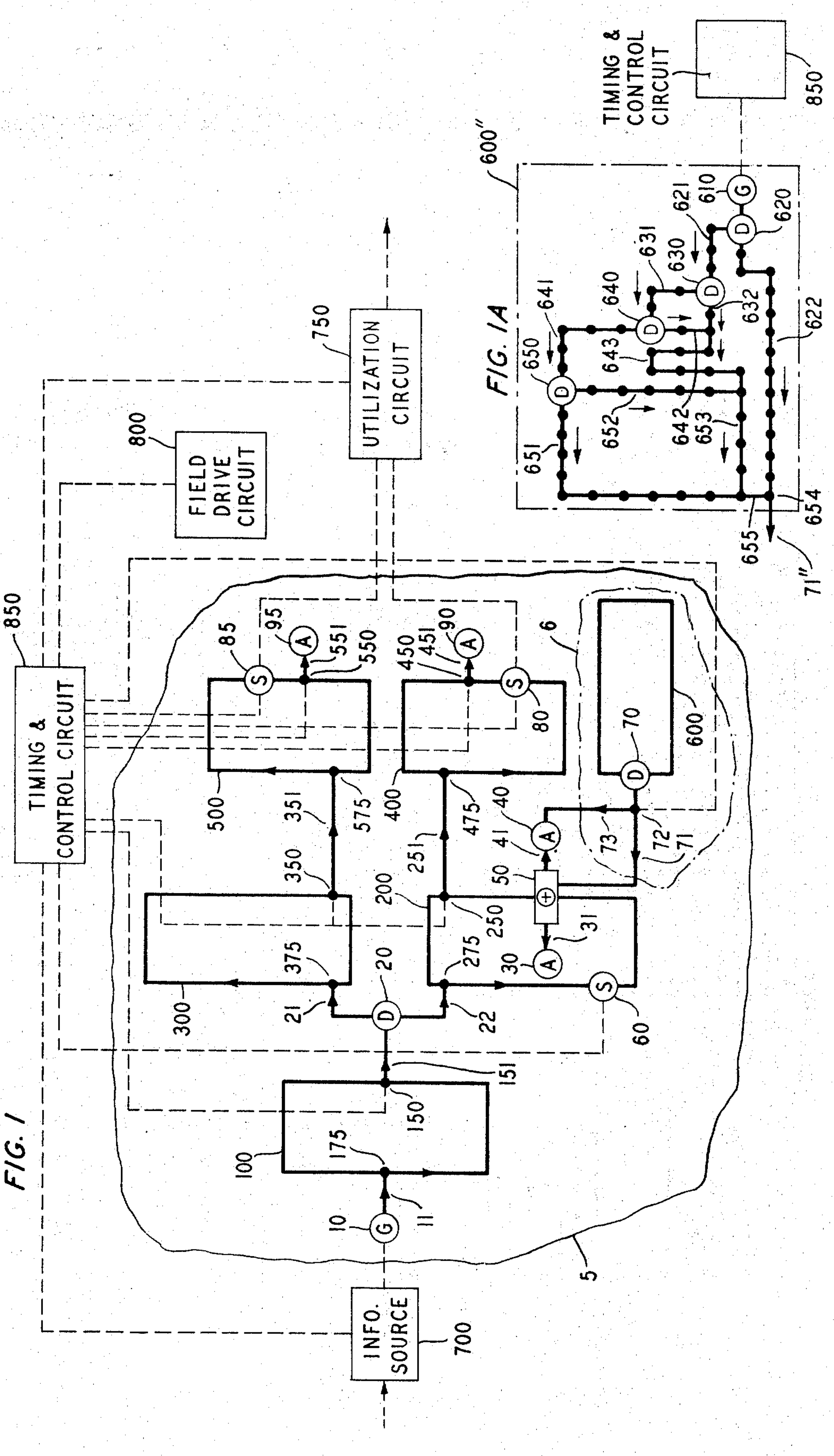
FIG. 1 depicts a schematic illustration of one embodiment of a cyclic encoding circuit for a field-access, single-wall domain apparatus.

A field-access, single-wall domain, encoder circuit for realizing the cyclic encoding function is illustratively shown in schematic form in FIG. 1. The encoder circuit is configured to implement what is known in the art as a (39,26) Bose-Chaudhuri-Hoquenghem (BCH) error-correcting code.

In short, the (39,26) BCH Code is formulated by appending a serial string of 13 parity checking bits onto an information word of 26 bits that is to be encoded for transmission. The 13 parity bits are calculated by dividing the information word by the binary generator function 11 010 000 001 011, which uniquely characterizes the (39,26) BCH Code.

In its most fundamental form, the basic encoder circuit comprises an overlay pattern defining a plurality of circular shift registers, domain propagation channels, domain duplicators, domain sensing circuits, domain annihilators, domain generators and a domain logic circuit, all of which are configured upon a sheet of suitable material 5.

The input to the encoder is a domain generator 10 which is electronically coupled to an information word source 700. Domain generator 10 produces a serial pattern of domains corresponding to an uncoded information word in response to an electronic representation of the word provided by information source 700. A domain generator which is suitable for generator 10 is shown and described in U.S. Pat. No. 3,555,527, issued Jan. 12, 1971 to A. J. Perneski. Another example of a domain generator is shown and described in "Magnetic Bubbles," by A. H. Bobeck and H. E. D. Scovil, at pp. 78–90 of the June 1971 issue of *Scientific American*.

The output of generator 10 is connected through a domain propagation channel 11 to an element 175 of a circular, domain, shift register 100, which is comprised of 38 element periods. Element 175 is configured to allow domains to be coupled into register 100 and is also configured to prevent any domains circulating in register 100 from passing out through channel 11. Examples of element periods and shift registers in the field-access mode of domain technology that are suitable for register 100 are shown and described in U.S. Pat. No. 3,534,347, issued Oct. 13, 1970 to A. H. Bobeck, and in "Magnetic Bubbles," *supra*.

The number of element periods in register 100 will be shown to be determined by the interval between the bits generated by information source 700. In the illustrative embodiment of the cyclic encoder circuit shown in FIG. 1, the bits of the serial pattern of domains representing the uncoded information word are assumed to arrive at element 175 from generator 10 at the uniform rate of one bit every $39t$ seconds. A field-drive circuit 800 is included in conjunction with the encoder circuit to provide a rotating magnetic field with a period of $t$ seconds in the plane of sheet 5. The period of the rotating field is determined by the arrival rate of the uncoded information word. In general, for an $(n, k)$ BCH Code the period of the rotating field is $n$ times less than the bit period of the uncoded word. A suitable field-drive circuit for providing the in-plane field is shown and described in U.S. Pat. No. 3,720,883, issued Mar. 13, 1973 to W. E. Hess, Jr. and G. P. Vella-Coleiro.

The field rotation period of $t$ seconds is chosen in conjunction with the arrival rate of the uncoded information word (1 bit every $39t$ seconds) and the number (38) of element periods in register 100 to allow each bit of the uncoded information word that is coupled into register 100 at element 175 to propagate through one complete circulation cycle in the register, plus one additional element, before the next bit of the information word arrives at element 175. This has the effect of allowing a serial pattern of domains representing the uncoded information word to be "packed" into register 100 at adjacent element locations, which are effectively spaced at intervals of $t$ seconds apart. By the end of $975t$ seconds (25 bits × $39t$ seconds/bit) after the arrival of the first bit of the 26-bit uncoded information word in register 100, all of the bits of a pattern of domains representing the word are circulating at sequential element locations in register 100.

After a pattern of domains representing the complete uncoded information word has been "packed" into register 100 at 26 adjacent element locations, the pattern is diverted from register 100 into a propagation channel 151. This is accomplished by including an electronically controlled channel gating element 150 as one of the 38 elements comprising register 100. Gating element 150 and channel 151 are configured to allow the entire 26-bit pattern of domains circulating in register 100 to be steered out of loop 100 and into channel 151, which leads to a domain duplicator 20, in response to an electronic signal provided by an electronic timing and control circuit 850. Examples of elements which are suitable for element 150 are shown and described in "Magnetic Bubbles," *supra*, and in U.S. Pat. No. 3,680,067, issued to W.F. Chow on July 25, 1972. An example of a domain duplicator suitable for duplicator 20 is shown and described in U.S. Pat. No. 3,713,118, issued Jan. 23, 1973 to I. Danylchuck and in "Magnetic Bubbles," *supra*. Timing circuit 850 can be any of a number of well-known electronic timing circuits which are capable of counting the field rotation cycles produced by field-drive circuit 800, and, after predetermined cyclic intervals, providing logic level signals suitable for controlling gating element 150.

In duplicator 20, the 26-bit pattern of domains representing the uncoded information word is split into two like patterns of domains. One of the two resulting patterns is gated through a domain propagation channel 21 and a gating element 375 into a circular holding register 300 having 39 element periods, and the other pattern of domains is gated through a domain propagation channel 22 and a gating element 275 into a circular interaction shift register 200 having 38 element periods. Elements 375 and 275 are identical in structure and function to element 175 and effectively provide unidirectional access to registers 300 and 200 through channels 21 and 22, respectively.

The function of holding register 300 is merely to dynamically store a pattern of domains representing the uncoded 26-bit information word while a string of parity bits is being calculated in register 200. The parity bits are calculated in register 200 by serially dividing the 26-bit pattern of domains representing the uncoded information word by a pattern of domains representing the (39,26) BCH Code generator function.

The division process is achieved by including one input and an output of a single-wall domain, Exclusive-OR, logic circuit 50 and a domain sensor 60 among the 38 element periods of register 200. Exclusive-OR circuit 50 can be any one of a number of single-wall domain, Exclusive-OR, logic circuits which provide at least two inputs and a single output. Examples of such circuits are shown and described in U. S. Pat. No. 3,723,716, issued Mar. 27, 1973 to A. H. Bobeck and H. E. D. Scovil, and in "Magnetic Bubbles," *supra*.

Domain annihilators 30 and 40 are provided in conjunction with Exclusive-OR circuit 50 to dispose of unwanted domains in the case where both input bits to the Exclusive-OR circuit are represented by domains and the output bit is represented by the absence of a domain. Domain annihilators suitable for annihilators 30 and 40 are shown and described in U.S. Pat. No. 3,577,131, issued May 4, 1971 to R. H. Morrow and A. J. Perneski and in "Magnetic Bubbles," *supra*.

The generator function for the (39,26) BCH Code is dynamically stored in a circular domain shift register 600, having 39 element periods, which is adjacent register 200. Included among the 39 elements of register 600 are the input and one output of a domain duplicator 70. The other output of duplicator 70 is connected to an electronically controlled channel gating element 72 which controls access to a pair of domain propagation channels 71 and 73. Channel 71 leads to one input of Exclusive-OR circuit 50 and channel 73 leads to domain annihilator 40. Gating element 72 is identical in structure to element 150 and operates in response to an electronic gating signal provided by timing circuit 850.

Domain sensor 60 in register 200 is simply an element configured to provide an electronic, logic; level signal whenever a domain is detected at that element position. Whenever a domain is sensed by sensor 60, an electronic signal is produced by sensor 60 and coupled to timing circuit 850 where it triggers an electronic gating signal that configures channel gate 72 to steer domains from duplicator 70 into channel 71, rather than channel 73, for a period of 14 field rotation cycles (14$t$ seconds). Examples of a domain sensor which are suitable for sensor 60 are shown and described in U.S. Pat. No. 3,609,720, issued to W. Strauss, on Sept. 28, 1971, and in "Magnetic Bubbles," *supra*.

Domain duplicator 70 is serially connected within the loop of register 600 in a manner to simply return each bit of the generator function to the loop after it is duplicated. As a result, the generator function in register 600 remains intact while a duplicate pattern of domains representing the function is being coupled to channel gating element 72. There, the duplicate pattern is either gated through channel 71 to one input of Exclusive-OR circuit 50 or gated through channel 73 to annihilator 40 where it is annihilated. Normally, the duplicate pattern is simply gated through channel 73 to annihilator 40. However, when channel gate 72 is enabled by the electronic gating signal from timing circuit 850, the entire 14-bit pattern is gated through channel 71 to Exclusive-OR circuit 50 where it is interacted bit by bit with corresponding bits of the pattern of domains circulating in register 200.

The interaction process in register 200 begins during the first circulation cycle after the 26-bit pattern of domains representing the uncoded information word is coupled through element 275 into register 200. If the leading bit of the pattern is represented by a domain, an electronic signal is generated when the domain passes through sensor 60. This electronic signal is coupled to timing circuit 850 which in turn generates a gating signal enabling channel gate 72 for a period of 14 field rotation cycles. This results in a duplicate of the pattern of domains representing the 14-bit generator function being coupled through channel 71 to Exclusive-OR circuit 50, rather than through channel 73 to annihilator 40.

By carefully restricting the effective propagation path length between duplicator 70 and Exclusive-OR circuit 50 to be equal to the path length in register 200 between sensor 60 and Exclusive-OR circuit 50, the duplicate of the leading bit of the generator function and the leading bit of the information word are constrained to arrive at the inputs of Exclusive-OR circuit 50 at the same time. The resulting Exclusive-OR product then replaces the leading bit of the information word at its relative position among the bits of the information word as it circulates about register 200. Any surplus domains which result from the interaction are simply gated to annihilator circuits 30 and/or 40 through channels 31 and 41, respectively, where they are annihilated.

Each of the remaining 13 bits of the generator function is then interacted in similar fashion with a corresponding bit of bits 2–14 of the information word, and, in each instance, the Exclusive-OR product of the interaction replaces the particular interacting bit of the information word. After all 14 of the interactions have been completed, the first 14 bits of the information word have been replaced by the Exclusive-OR products of the first 14 information bits and their corresponding bits of the generator function.

During the following circulation cycle the second bit of the now modified information word is sensed by sensor 60. If the second bit is represented by a domain bits 2–15 of the modified information word are interacted in the same manner with the 14 bits of the generator function, and, again, the Exclusive-OR products of the individual interactions replace the particular interacting bits of the information word.

This sensing and interaction process occurs a total of 26 times over a period of 26 circulation cycles, upon the completion of which each of the 26 bits of the pattern of domains circulating in register 200 has been sensed by sensor 60 and has controlled an interaction between the generator function and a corresponding part of the pattern of domains circulating in register 200.

After each of the bits of the 26-bit pattern of domains circulating in register 200 has passed through Exclusive-OR circuit 50 a total of 26 times, the resulting pattern of domains represents the remainder, or residue, of the uncoded information word divided by the generator function of the (39,26) BCH Code. At this point, all that remains to complete the coding operation is to sense the contents of the patterns of domains representing the uncoded information word and the remainder and to convert these representations into electronic signals which are suitable for transmission.

This is accomplished by gating out the contents of registers 200 and 300 through gating elements 250 and 350, propagation channels 251 and 351, and elements 475 and 575 into sensing register loops 400 and 500, respectively, where the patterns of domains are sensed and annihilated. Sensing loop 400 (500) comprises 25 element periods, including a sensor 80 (85), input element 475 (575), and an electronically controlled channel gating element 450 (550). Element 475 (575) is identical in structure and performs the same function as element 175 in register 100, and elements 250 (350) and 450 (550) are identical in structure and perform the same function as element 150.

An annihilator 90 (95) is connected to element 450 (550) through a domain propagation channel 451 (551). The purpose of annihilator 90 (95) is to dispose of each bit circulating in register 400 (500) after the bit of the pattern is sensed in sensor 80 (85).

This is accomplished by providing an electronic utilization circuit 750 which registers the electronic representation of each bit as it is sensed in sensor 80 (85). Sensing circuit 750 in turn communicates this information to timing circuit 850 which controls gating element 450 (550). Each time a domain is sensed by sensor 80 (85) the domain is gated out through element 450 (550) and channel 451 (551) into annihilator 90 (95), where it is annihilated.

Although the patterns of domains circulating in registers 400 and 500 could be sensed simultaneously, they are sequentially sensed at a rate which allows the complete encoded information word of 39 bits to be outputed in the same time that it takes the uncoded information word to be inputed from informated source 700 into the circuit. In other words, 26-bit uncoded information words which arrive at the rate of one bit every $39t$ seconds, take $1014t$ seconds ($39t$ seconds/bit × 26 bit/word) to be inputed to the encoder. It is therefore desirable to output the composite 39-bit encoded information word during an equal interval, or, equivalently, at the rate of one bit every $26t$ seconds.

This effective rate change is advantageously achieved by circulating the 26-bit uncoded information word in loop 500, which has 25 element periods, a total of 26 times and enabling sensor 85 to read out a different bit during each of these circulation cycles. As a result, the bits of the uncoded information word are detected by utilization circuit 750 at the rate of one bit every $26t$ seconds. Similarly, the 13-bit remainder circulating in loop 400, which also has 25 element periods, is circulated a total of 39 times, with one bit being detected by utilization circuit 750 during each of the final 13 circulation cycles.

As a result, utilization circuit 750 receives, first, electronic representations of all 26 bits of the uncoded information word and, secondly, electronic representations of the 13-bit remainder, or string of parity checking bits. The entire 39-bit encoded information word is serially outputed at the rate of one bit every $26t$ seconds in a total of $1014t$ seconds, which is equal to the interval that it took to input the 26-bit uncoded information word.

A modification of the first embodiment of the (39,26) BCH encoder circuit shown in FIG. 1 is depicted in FIG. 1–A. The second embodiment of the encoder circuit is similar in all respects to the circuit shown in FIG. 1 with the exception that the portion identified by reference character 6 in FIG. 1 is replaced by a function generator 600'', which is shown in FIG. 1–A.

Function generator 600'' produces a pattern of domains corresponding to the (39,26) BCH generator function and couples them through a domain propagation channel 71'' to Exclusive-OR circuit 50, in response to an electronic control signal from timing circuit 850. The timing of the electronic control signal and the length of propagation channel 71'' are chosen to provide that corresponding domains of the generator function and the pattern circulating in register 200 arrive at the inputs of Exclusive-OR gate 50 in synchronism.

Basically, function generator 600'' comprises a plurality of single-wall domain splitters 620, 630, 640, and 650 interconnected through a plurality of domain propagation channels 621, 622, 631, 632, 641, 642, 643, 651, 652, 653, and 655 having path length of 3 element periods, 13 element periods, 8 element periods, 1 element period, 5 element periods, 1 element period, 8 element periods, 10 element periods, 5 element periods, 4 element periods, and 1 element period, respectively.

The input to the network is connected to a domain generator 610. Each time a selected bit of the pattern circulating in register 200 appears under the location of sensing element 60 the bit is sensed to detemine if it is represented by a domain. If the sensed bit is represented by a domain, an electronic signal is coupled through timing circuit 850 to domain generator 610. A domain is generated and gated into splitter 620 which comprises the input to the network. The domain is duplicated in splitter 620 and the two resultant domains are gated into propagation channels 621 and 622 and propagated along to subsequent domain splitters. The particular positions of the domain splitters and the lengths of the interconnecting paths are chosen so that a domain entering the network, causes a pattern of domains corresponding to the generator function to arrive at a common convergence terminal 654 of the network and be coupled out along channel 71'' to Exclusive-OR circuit 50 in the proper sequence.

More generally, any uncoded information word of $k$ bits can be encoded according to any $(n, k)$ BCH error-correcting code by modifying the illustrative (39,26) encoding circuit, shown in FIG. 1, according to the following basic principles.

Assuming that the $k$ bit information word arrives serially at the rate of one bit every $n \cdot t$ seconds, the period of the rotating magnetic field produced by field-drive circuit 800 is fixed at $t$ seconds. Holding register 100 comprises $(n-1)$ element periods, register 300 comprises $n$ element periods, register 200 comprises $(n-1)$ element periods, registers 400 and 500 each comprise $(k-1)$ element periods, and register 600 comprises $n$ element periods.

For each uncoded word, the "packing" function provided by register 100 is achieved by circulating the contents of the register $k$ times after the arrival of the leading bit of the uncoded information word into the register. The contents of registers 200, 300, and 500 are each circulated a total of $k$ times in the manner and during the intervals described above, register 400 is circulated $n$ times, and register 600 is continually circulated during the entire operation of the encoder circuit.

The precise locations within the respective registers of elements 150, 175, 375, 350, 275, 250, 575, 550, 475, and 450 are not especially critical. The major criteria to be followed with respect to locating these elements within the registers is that elements 375 and 275, 350 and 250, 475 and 575, and 450 and 550 should be symmetrically located within registers 200 and 300, and 400 and 500, respectively, as shown in FIG. 1. The same criteria applies with respect to sensors 80 and 85. If these criteria are all satisfied an electronic representation of an $n$-bit encoded information word will be coupled to utilization circuit 750 at a uniform rate of one bit every $k$ seconds.

Figure 2:
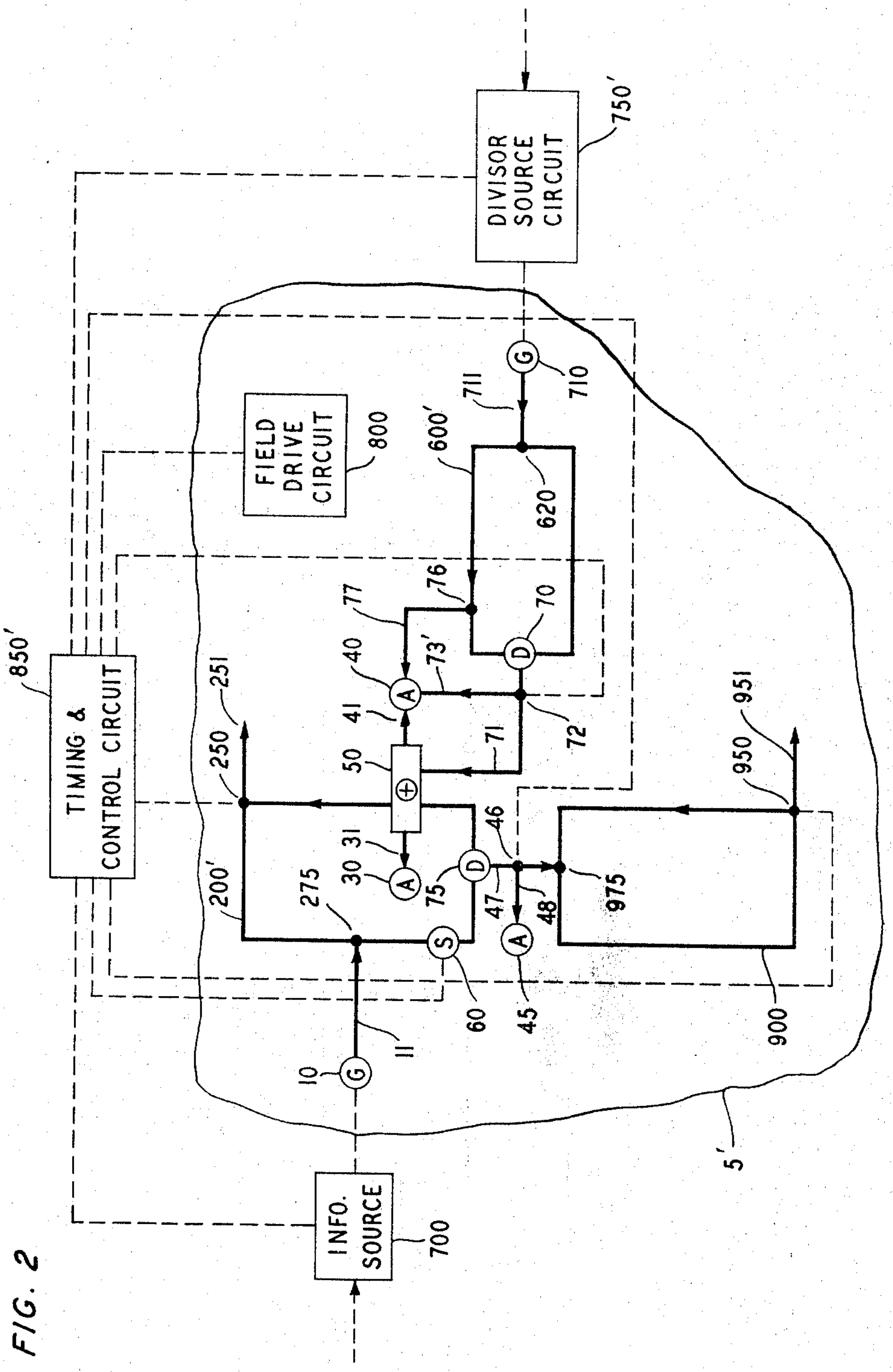
FIG. 2 shows a schematic illustration of a binary division circuit for a field-access, single-wall domain apparatus.

With several modifications the encoder circuit described above for implementing an $(n, k)$ BCH Code can be configured to perform binary division. An example of such a binary division circuit, is shown in schematic form in FIG. 2 as an overlay pattern configured on a sheet of suitable material 5'.

Basically, the binary division circuit comprises three domain shift register loops 200', 600', and 900. Registers 200' and 600' are similar in most respects and include all the elements of registers 200 and 600 of the encoder circuit depicted in FIG. 1. Register 200' also includes a domain duplicator 75 with an input and an output serially connected in the register loop between sensor 60 and Exclusive-OR circuit 50. The other output of duplicator 75 connects through a propagation channel 47 to an input element 975 in register loop 900, which comprises $n$ element periods. An electronically controlled channel gating element 46 is included among the elements of channel 47. In its normal state, gating element 46 diverts domains propagating through channel 47 into a channel 48 leading to a domain annihilator 45. However, in response to an electronic control signal from a timing circuit 850, gating element 46 allows domains to be coupled straight on through to register 900. Register 200' is further distinguished from register 200 in that element 275 is directly connected through channel 11 to generator 10.

Register 600' is similar in all respects to register 600 with the exception of providing an input element 620 through which a pattern of domains representing a divisor is loaded into the register via a channel 711 from a domain generator 710 that is under the control of a divisor source circuit 750'. Another exception is that an electronically controlled channel gating element 76 is provided for gating a pattern of domains circulating in register 600' through a channel 77 into annihilator 40 whenever it is desired to load a new divisor into register 600'.

The binary division process is initiated by loading a $k$ bit pattern of domains representing the dividend through channel 11 and element 275 into register 200' (which has $(n-1)$ element periods). Similarly, a pattern of domains representing a $(k/2 + 1)$-bit divisor is loaded into register 600' (which has $n$ element periods) through channel 711 and input element 620. Register 900 is then cleared of any residual domains by gating them out through an electronically controlled gating element 950 into a channel 951.

The patterns of domains in register 200' and 600' are then circulated in the same manner and for the same number of times as in the operation of the encoder circuit described above. The only exception of note to this operation is that each bit which is sensed by sensor 60 is duplicated in duplicator 75 and passed out through gating element 46, channel 47, and input element 975 into register 900. All of the other bits of the pattern which are duplicated in duplicator 75 are simply gated through element 46 and channel 48 into annihilator 45.

At the end of $k$ circulation cycles the remainder of the division process is represented by the $k$ bit pattern of domains circulating in register 200, and the quotient is represented by the $k$ bit pattern of domains circulating in register 900. These patterns are then gated out through channel gating elements 250 and 950 into channels 251 and 951, respectively, where they are either coupled to other domain apparatus or converted into electronic signals.

Thus, it should now be apparent that field-access, single-wall domain circuits for implementing cyclic error-correcting codes and binary division have been taught in accordance with the invention and fully satisfy the objects, aims and advantages set forth in the foregoing Description of the Invention. While the invention has been described in terms of the specific embodiments depicted in FIGS. 1 and 2, it is evident that in light of the foregoing Description many alternatives, modifications and variations will be apparent to those skilled in the art to which the subject matter pertains. Accordingly, it is intended to embrace all such alternatives and modifications as fall within the spirit and scope of the following claims:

What is claimed is:

1. A field-access single-wall domain apparatus, including:

a layer of material in which single-wall magnetic domains are movable; and a plurality of periodically repeating domain propagation elements serially arranged adjacent the surface of said layer in first and second looping shift registers, said elements being responsive to a magnetic field reorienting in the plane of said surface for synchronously circulating about said first and second shift registers first and second sequential patterns of domains representing binary information, the bits of said first and second patterns corresponding with one another in accordance with the respective domain positions in said first and second patterns of domains, a first predetermined element in said first shift register including means for sensing the presence of a domain located under that element location and for providing an electrical sensing signal in response thereto, an electrical conduction path connecting to said sensing means, a second predetermined element in said first shift register, a first predetermined element in said second shift register, a first domain propagation channel connecting between said second predetermined element in said first register and said first predetermined element in said second register, said first domain propagation channel including a first predetermined gating element, connected through said electrical conduction path to said sensing means, for controllably gating said second pattern of domains from said first predetermined element in said second loop to said second predetermined element in said first loop in response to said sensing signal, and means in said second predetermined element in said first loop for synchronously interacting corresponding bits of said first and second patterns of domains and replacing each of the interacting bits of said first pattern with a new bit representative of the interaction product.

2. The apparatus in accordance with claim 1 in which said interacting means includes an Exclusive-OR logic gate, a first input and the output of which are serially connected in said first shift register and a second input of which connects through said first domain propagation channel to said first element in said first domain propagation channel, said Exclusive-OR gate performing Exclusive-OR logic on the corresponding bits of said first and second patterns of domains and replacing each of the interacting bits of said first pattern with the Exclusive-OR product of the interaction.

3. The apparatus in accordance with claim 2 in which said first shift register comprises $(n-1)$ periodically repeating domain propagation elements, where $n$ is a characterizing factor in an $(n, k)$ BCH error-correcting code;

said second shift register comprises $n$ periodically repeating domain propagation elements; and said first predetermined element in said second shift register includes means, having an input and a first output serially connected in said second shift register and a second output connecting through said first domain propagation channel to said second input of said Exclusive-OR gate, for duplicating said second pattern of domains, said second pattern being coupled to said second input of said Exclusive-OR gate and a duplicate of said second pattern being coupled back into said second register.

4. The apparatus in accordance with claim 3 comprising:

a third looping shift register arranged adjacent the surface of said layer and comprising $(n-1)$ periodically repeating domain propagation elements;

means, having first and second outputs, for duplicating a pattern of domains representing a $k$-bit uncoded information word, where $k$ is a characterizing factor of said $(n, k)$ BCH error-correcting code, to form said first pattern of domains and a duplicate third pattern of domains;

a first predetermined gating element in said first shift register;

a first predetermined gating element in said third shift register;

second and third domain propagation channels, respectively connecting between said first and second outputs of said duplicating means and said first predetermined gating elements in said first and third shift registers, for respectively coupling said first and third patterns of domains from said duplicating means to said first and third shift registers;

a second predetermined gating element in said first shift register;

a second predetermined gating element in said third shift register;

a fourth domain propagation channel connecting to said second gating element in said first shift register;

a fifth domain propagation channel connecting to said second gating element in said third shift register;

means, connecting to said fourth and fifth domain propagation channels, for combining said pattern of domains in said first shift register with said third pattern of domains to form an $n$-bit BCH code word after the pattern of domains of said first shift register has been circulated through and interacted in said Exclusive-OR gate $k$ times.

5. An apparatus in accordance with claim 4 in which said means for combining said first and third patterns of domains comprises fourth and fifth looping shift registers each of which is comprised of $(k-1)$ periodically repeating domain propagation elements serially arranged adjacent the surface of said layer.

6. An apparatus in accordance with claim 5 in which each of said fourth and fifth shift registers comprises elements which include means, serially connected within the shift register, for sensing and means for annihilating a different domain each time a pattern is circulated in the shift register.

7. A binary division circuit in accordance with claim 2 comprising a third predetermined element in said first shift register which includes means for duplicating different selected bits of the pattern of domains then circulating in said first shift register, a domain storage register, a second domain propagation channel connecting between said duplicating means and said storage register, means in said second channel for controllably gating the duplicated bits into said register in response to said sensing signal, the resulting pattern of such bits representing the quotient of a binary number represented by said first pattern divided by a binary number represented by said second pattern after said first pattern has propagated through said Exclusive-OR gate a number of times equal to the number of bits in said first pattern.

8. A binary division circuit in accordance with claim 7 in which said storage register comprises $n$ periodically repeating domain propagation elements serially arranged in a looping geometry adjacent the surface of said layer;

said storage register includes a first predetermined gating element;

said duplicating means comprises a domain duplicating circuit having an input and first and second outputs, said input and said first output being serially connected in said first shift register;

said second domain propagation channel connects between said second output of said duplicating circuit and said first gating element in said storage register, said gating means in said second channel including a gating element for gating to said storage register a duplicate of a different selected bit of the pattern then circulating in said first shift register each time such pattern is circulated in said first shift register.

9. A binary division circuit in accordance with claim 2, comprising:

a third looping shift register serially arranged adjacent the surface of said layer, said shift register comprising *n* periodically repeating domain propagation elements, where *n* is a positive integral number;

a first predetermined gating element in said first shift register;

a first predetermined gating element in said second shift register;

means for loading into said first shift register at its first predetermined gating element a pattern of domains initially representating a *k*-bit dividend, where *k* is a positive integral number less than *n;* means for loading into said section shift register at its first predetermined gating element a pattern of domains representing a ($k$/2+1)-bit divisor; and means, serially connected in said first shift register, for duplicating a different selected bit of the pattern of domains circulating in said first shift register, during each circulation cycle and for coupling a pattern of domains representing the duplicates of the selected bits to said third shift register, whereby a pattern of domains representing the binary quotient of said dividend divided by said divisor accumulates in said third shift register and a pattern of domains representing the binary remainder of such division process accumulates in said first shift register.

10. A binary division circuit in accordance with claim 9 in which said duplicating and coupling means includes a domain duplicator having an input and first and second outputs, the input and the first output of which are serially connected in said first shift register;

second, third and fourth domain propagation channels;

a first predetermined gating element in said third shift register;

a domain annihilator;

a second channel gating element having an input and first and second outputs, the input of said second gating element connecting through said second domain propagation path to the second output of said domain duplicator, the first output of said second gating element connecting through said third domain propagation channel to said first gating element in said third shift register, and the second output of said second gating element connecting through said fourth domain propagation channel to said annihilator, said second gating element being responsive to said sensing signal for normally gating bits from said second output of said duplicator to said annihilator and gating only selected bits from said second output of said duplicator into said third shift register.

11. A magnetic domain apparatus, including:

a layer of material in which single-wall magnetic domains are movable;

a first plurality of periodically repeating domain propagation elements arranged adjacent the surface of said layer in a looping shift register in the plane of said surface, for synchronously circulating thereabout a first pattern of domains representing binary information in response to a magnetic field reorienting a predetermined amount in the plane of said surface;

a plurality of domain duplicators arranged adjacent the surface of said layer;

a second plurality of periodically repeating domain propagation elements arranged adjacent the surface of said layer in a network of domain propagation channels which connect between individual ones of said plurality of duplicators at predetermined nodal locations in said network, the path lengths of said channels being selected to delay domains propagating therealong by different predetermined amounts so that a predetermined time-sequenced pattern of differently delayed domains arrives at a common element location defining the output of said network in response to a domain being propagated to an element location defining the input of said network;

a first domain propagation channel connecting to the output of said network;

means, having a first input and an output serially connected in said shift register and a second input connected through said first domain propagation channel to said output of said network, for performing Exclusive-OR logic between said first pattern of domains and said time-sequenced pattern of domains; and means, connected between a predetermined element location in said shift register and said input of said network, for sensing the presence of a selected domain at a predetermined element location in said shift register and gating a domain into said input of said network in response thereto, whereby the Exclusive-OR products of corresponding pairs of domains of said first pattern and said time-sequenced pattern replace the interacting domains of said first pattern, in response to the detection of a selected domain by said sensing means.

* * * * *